J. H. GLOVER.
Wheels for Vehicles.

No. 143,820.

Patented Oct. 21, 1873.

Witnesses.

Inventor.

UNITED STATES PATENT OFFICE.

JOSEPH H. GLOVER, OF FREEDOM, KENTUCKY.

IMPROVEMENT IN WHEELS FOR VEHICLES.

Specification forming part of Letters Patent No. 143,820, dated October 21, 1873; application filed June 28, 1873.

*To all whom it may concern:*

Figure 1:
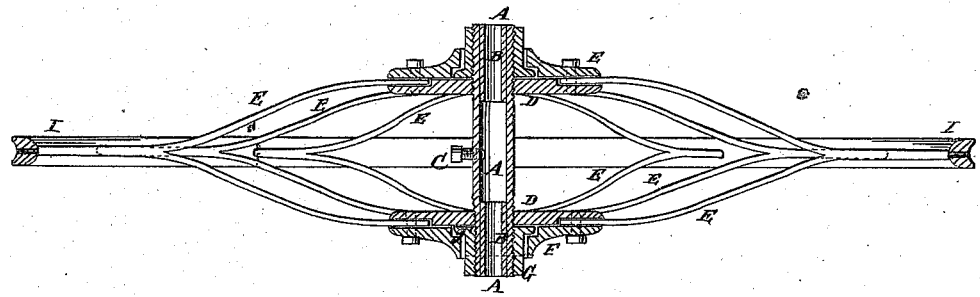
Figure 2:
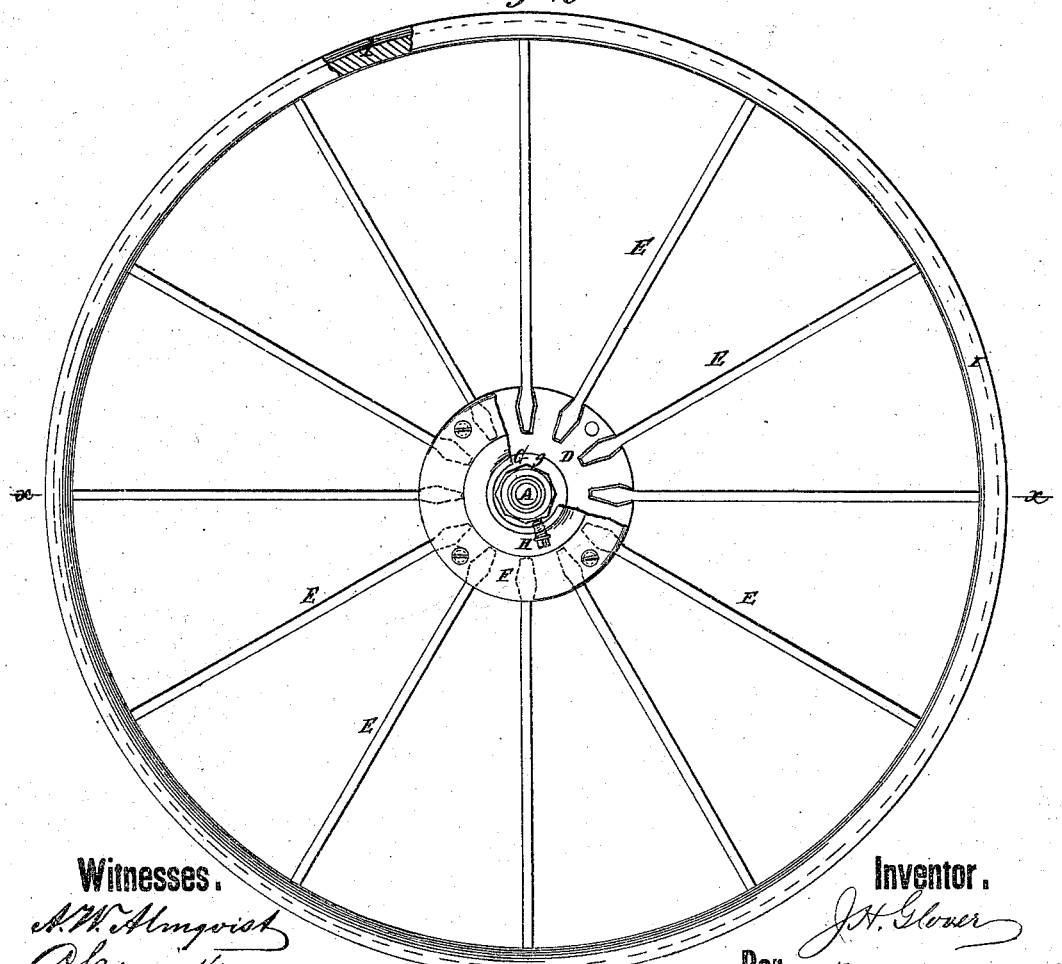

Be it known that I, JOSEPH H. GLOVER, of Freedom, in the county of Barren and State of Kentucky, have invented a new and useful Improvement in Vehicle-Wheels, of which the following is a specification:

Figure 1 is a detail central cross-section of my improved wheel taken through the line $x$ $x$, Fig. 2. Fig. 2 is a side view of the same, parts being broken away to show the construction.

Similar letters of reference indicate corresponding parts.

My invention has for its object to furnish an improved wheel for wagons, buggies, and other vehicles, which shall be stronger and more durable than wheels constructed in the ordinary manner, which will enable the wheel to be readily expanded and contracted to tighten the tire or rim, and allow the tire to be conveniently put on and taken off, and which may be lubricated without removing the wheel from the axle. The invention consists in the two hubs having dovetailed grooves formed in their outer sides, the two plates, the forked spokes, and the octangular tube in combination with each other; in the combination of the anti-friction bearings with the tube; in the combination of the screw-plug with the hole formed in the middle part of the tube to enable the axle to be lubricated without removing the wheel; in the combination of the flanged nuts with the tube, the hubs, the plates, and the forked spokes; in the rim made convex upon its inner side, and concave upon its outer side, in combination with the forked spokes, the hubs, the plates, the nuts, and the tube, as hereinafter fully described.

A is the octagonal tube, which has a screw-thread cut upon each end, and is lined at each end with babbit or other anti-friction metal, B, to form the bearings for the axle. The bearings B thus form a space in the middle part of the tube, to serve as an oil-reservoir to keep the axle lubricated. The oil is poured in through a hole in the middle part of the tube A, which hole is closed with a screw-plug, C, which keeps the oil from escaping, and at the same time keeps out all dust and dirt. D are two hubs, which have octagonal holes formed through their centers, to fit and slide upon the tube A. In the outer sides of the hubs D are formed twelve, more or less, dovetailed recesses to receive the dovetailed inner ends of the spokes E, which are kept in place in said recesses by plates F, also placed upon the ends of the said tube A, and securely bolted to the hubs D. The inner part of the inner edge of the plates F is rabbeted to receive the flange $g'$ formed upon the inner end of the nuts G, which are screwed upon the ends of the tube A, and which hold the hubs D and plates F in place, and also move said hubs and plates out and in, as required. The nuts G are prevented from turning by set-screws H, which pass in through flanges formed upon the inner edges of the plates F, and rest against the sides of the said nuts G. The corresponding spokes from the two hubs D meet at or near their middle parts, and their outer parts are welded or otherwise securely connected together. The outer ends of the spokes E have tenons formed upon them, which enter holes in the rim I. The shoulders of said tenons rest against the inner surface of the said rim I. The rim I is made convex upon its inner side, and concave upon its outer side, which construction prevents the wheel from slipping.

By this construction the spokes E are shortened by spreading their inner forked ends apart by turning the nuts G outward. This shortens the spokes E and loosens the rim I. By turning the nuts G inward, the inner ends of the forked spokes E will be moved toward each other, the spokes E will be lengthened, and the rim I tightened.

Having thus described my invention, I claim as new and desire to secure by Letters Patent—

The rim I, made convex upon its inner side, and concave upon its outer side, in combination with the forked spokes E, the plate D, the plates F, nuts G, and tube A, substantially as herein shown and described.

JOSEPH H. GLOVER.

Witnesses:
A. F. MORROW,
J. T. BARTLETT.